United States Patent
Morikawa et al.

(10) Patent No.: US 10,421,856 B2
(45) Date of Patent: Sep. 24, 2019

(54) THREE-DIMENSION FORMING SUPPORT MATERIAL, THREE-DIMENSION FORMING COMPOSITION SET, THREE-DIMENSION FORMING APPARATUS, AND METHOD OF PREPARING THREE-DIMENSIONAL SHAPED PRODUCT

(71) Applicant: FUJI XEROX CO., LTD., Tokyo (JP)

(72) Inventors: Takashi Morikawa, Kanagawa (JP); Takashi Oyanagi, Kanagawa (JP); Hiroshi Inoue, Kanagawa (JP); Jun Kawahara, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 549 days.

(21) Appl. No.: 14/807,081

(22) Filed: Jul. 23, 2015

(65) Prior Publication Data
US 2016/0215135 A1 Jul. 28, 2016

(30) Foreign Application Priority Data

Jan. 22, 2015 (JP) .................................. 2015-010536

(51) Int. Cl.
| | | |
|---|---|---|
| *C08L 33/14* | (2006.01) | |
| *B33Y 10/00* | (2015.01) | |
| *B33Y 30/00* | (2015.01) | |
| *B33Y 70/00* | (2015.01) | |
| *B29C 64/112* | (2017.01) | |

(Continued)

(52) U.S. Cl.
CPC ............ *C08L 33/14* (2013.01); *B29C 64/112* (2017.08); *B29C 64/40* (2017.08); *B33Y 10/00* (2014.12); *B33Y 30/00* (2014.12); *B33Y 70/00* (2014.12); *C08F 2220/282* (2013.01); *C08F 2222/1086* (2013.01)

(58) Field of Classification Search
CPC ......... C08L 33/14; B33Y 10/11; B33Y 30/00; B33Y 70/00; B29C 67/0059; B29C 67/0092
See application file for complete search history.

(56) References Cited

U.S. PATENT DOCUMENTS

| | | | | |
|---|---|---|---|---|
| 4,874,799 A | * | 10/1989 | Hung | C08F 220/36 430/284.1 |
| 5,476,748 A | * | 12/1995 | Steinmann | C08F 283/00 430/269 |

(Continued)

FOREIGN PATENT DOCUMENTS

| | | |
|---|---|---|
| CN | 1771273 A | 5/2006 |
| CN | 102985497 A | 3/2013 |

(Continued)

OTHER PUBLICATIONS

Castor Oil (CAS No. 8001-79-4) Standard Specifications from Castor International, Sep. 29, 2014, http://www.castor-international.nl/cmdata/documents/Castor-oil-(printbare-versie-op-briefpapier-sjabloon).pdf.*

(Continued)

*Primary Examiner* — Jacob T Minskey
*Assistant Examiner* — Melody Tsui
(74) *Attorney, Agent, or Firm* — Oliff PLC

(57) ABSTRACT

A three-dimension forming support material includes a photocurable compound that contains an urethane (meth) acrylate and a non-photocurable polymer having a hydroxyl value of 60 mgKOH/g to 300 mgKOH/g.

17 Claims, 2 Drawing Sheets

(51) Int. Cl.
*B29C 64/40* (2017.01)
*C08F 220/28* (2006.01)
*C08F 222/10* (2006.01)

(56) References Cited

U.S. PATENT DOCUMENTS

| | | | | |
|---|---|---|---|---|
| 6,096,796 | A * | 8/2000 | Watanabe | G03F 7/0037 |
| | | | | 430/269 |
| 6,569,373 | B2 | 5/2003 | Napadensky | |
| 6,863,859 | B2 | 3/2005 | Levy | |
| 2006/0194938 | A1* | 8/2006 | Watanabe | C08F 290/067 |
| | | | | 528/44 |
| 2007/0012891 | A1 | 1/2007 | Maltezos et al. | |
| 2012/0214089 | A1* | 8/2012 | Honel | G03H 1/02 |
| | | | | 430/2 |
| 2013/0122310 | A1* | 5/2013 | Tielemans | C08G 18/6254 |
| | | | | 428/423.1 |
| 2013/0234370 | A1 | 9/2013 | Suzuki et al. | |

FOREIGN PATENT DOCUMENTS

| | | |
|---|---|---|
| CN | 103003328 A | 3/2013 |
| JP | 2003-080644 A | 3/2003 |
| JP | 2003-171630 A | 6/2003 |
| JP | 2005-036084 A | 2/2005 |
| JP | 2012-111266 A | 6/2012 |

OTHER PUBLICATIONS

Specification sheet for Kuraray Polyester Polyols, as published by Kuraray (Year: 2006).*
Specification sheet for Castor oil, as published by Castor International, Sep. 29, 2014 (Year: 2014).*
Specification sheet for TONE 0310 Polyol, https://coatings.specialchem.com/product/r-dow-chemical-tone-0310-polyol (Year: 2000).*
Jan. 26, 2018 Office Acion issued in Chinese Patent Application No. 201510569686.0.
Oct. 15, 2018 Office Action issued in Chinese Patent Application No. 201510569686.0.
Dec. 18, 2018 Office Action issued in Japanese Patent Application No. 2015-010536.
May 13, 2019 Office Action issued in Chinese Patent Application No. 201510569686.0.

* cited by examiner

THREE-DIMENSION FORMING SUPPORT MATERIAL, THREE-DIMENSION FORMING COMPOSITION SET, THREE-DIMENSION FORMING APPARATUS, AND METHOD OF PREPARING THREE-DIMENSIONAL SHAPED PRODUCT

CROSS-REFERENCE TO RELATED APPLICATIONS

This application is based on and claims priority under 35 USC 119 from Japanese Patent Application No. 2015-010536 filed Jan. 22, 2015.

BACKGROUND

1. Technical Field

The present invention relates to a three-dimension forming support material, a three-dimension forming composition set, a three-dimension forming apparatus, and a method of preparing a three-dimensional shaped product.

2. Related Art

A three-dimension forming apparatus, also called a 3D printer, is known as an apparatus for producing a three-dimensional shaped product (for example, parts of industrial products, toys such as dolls, and the like), in which the three-dimensional shaped product is produced by repeating the following processes of: disposing a forming material (model material) using an ink jet method according to three-dimensional cross-sectional shape data; and curing the forming material with ultraviolet (UV) or electron beam (EB).

In three-dimension forming apparatus, in order to form a freely-shaped three-dimensional structure, in the case of forming an overhang or ceiling, a support material for forming a support portion supporting the lower portion of the forming material is required.

When the discharge head of the apparatus has a single nozzle (discharge portion discharging only one composition), as the support material, the same material as the forming material is used. In this case, a method in which the support portion is prepared by a forming material having a lowered density, this is, which is different from the forming material for forming a shaped product and is finally removed is used.

When the discharge head of the apparatus has a multi-nozzle (discharge portion discharging two compositions), as the support material, a dedicated material, from which the support portion is easily separated, is used.

SUMMARY

According to an aspect of the invention, there is provided a three-dimension forming support material including: a photocurable compound that contains urethane (meth)acrylate; and a non-photocurable polymer having a hydroxyl value of 60 mgKOH/g to 300 mgKOH/g.

BRIEF DESCRIPTION OF THE DRAWINGS

Exemplary embodiments of the present invention will be described in detail based on the following figures, wherein.

DETAILED DESCRIPTION

Figure 1:
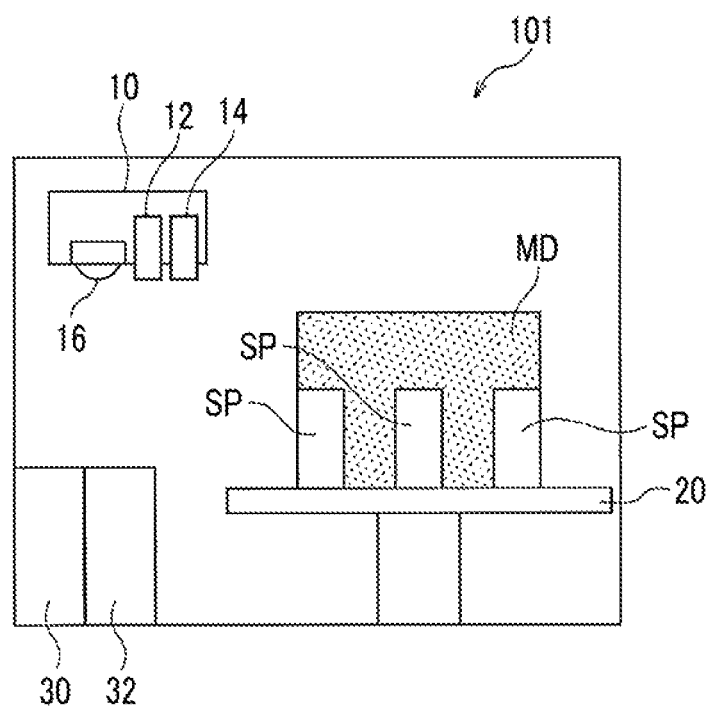
FIG. 1 is a configuration view schematically showing an example of a three-dimension forming apparatus according to the present embodiment.

Hereinafter, embodiments of the present invention will be described in detail.

Three-Dimension Forming Support Material

The three-dimension forming support material (hereinafter, referred to as "support material") according to the present embodiment contains a photocurable compound and a non-photocurable polymer. Here, the photocurable compound includes an urethane (meth)acrylate. Further, the non-photocurable polymer is a non-photocurable polymer having a hydroxyl value of 60 mgKOH/g to 300 mgKOH. Here, the support material (three-dimension forming support material) means a material before curing of the photocurable compound or a material after curing of the photocurable compound.

When a three-dimension forming material (hereinafter, referred to as "model material") containing a photocurable compound including an urethane (meth)acrylate is used as the support material according to the present embodiment, a support portion (hereinafter, referred to as "support portion") having excellent strippability from a shaped product is formed according to the composition thereof. The reason for this, although not clear, is inferred to be that the non-photocurable polymer having a hydroxyl value within the above range has high compatibility with the urethane (meth)acrylate to decrease the concentration of a photocurable compound in the support material, and thus the reactivity of a photocurable compound in the support material is lowered, thereby lowering the mechanical properties (for example, hardness, bending strength, and the like) after photocuring.

Further, since the support material according to the present embodiment has excellent strippability from a shaped product, the easy removal of the support portion is realized. Moreover, waste liquid requiring appropriate disposal is not caused.

Further, according to the support material of the present embodiment, it is possible to easily prevent the interface damage occurring at the time of removing the support portion from the shaped product. The reason for this, although not clear, is inferred that, when the support material contains the non-photocurable polymer having a hydroxyl value within the above range, the concentration of a photocurable compound in the support material is lowered, thereby preventing the reaction of a photocurable compound in the model material with a photocurable compound in the support material.

Hereinafter, the support material according to the present embodiment will be described in detail.

The support material according to the present embodiment contains a photocurable compound and a non-photocurable polymer. The support material may contain other additives, such as a photopolymerization initiator, a polymerization inhibitor, a surfactant, and a colorant, in addition to the photocurable compound and the non-photocurable polymer.

Photocurable Compound

The photocurable compound is a compound which is cured (polymerized) by light (for example, ultraviolet light or electron beam). The photocurable compound contains an urethane (meth)acrylate. The photocurable compound may contain other photocurable compounds in addition to the urethane (meth)acrylate.

Urethane (Meth)Acrylate

The urethane (meth)acylate (hereinafter, simply "urethane (meth)acrylate") is a compound having an urethane structure and two or more (meth)acryloyl groups in one molecule. The urethane (meth)acylate may be a monomer or an oligomer, preferably is an oligomer.

In the present specification, (meth)acrylate refers to both of acrylate and methacrylate. Further, (meth)acryloyl refers to both of an acryloyl group and a methacryloyl group.

The number of functional groups ((meth)acryloyl group) of the urethane (meth)acrylate may be 2 to 20 (preferably 2 to 15).

Examples of the urethane (meth)acrylate include reaction products of a polyisocyanate compound, a polyol compound, and a hydroxyl group-containing (meth)acrylate. Specifically, as the urethane (meth)acrylate, which is a prepolymer obtained by the reaction of a polyisocyanate compound and a polyol compound, there is exemplified a reaction product of a prepolymer having an isocyanate group at the terminal thereof with a hydroxyl group-containing (meth)acrylate. In addition, as the urethane (meth)acrylate, there is exemplified a reaction product of a polyisocyanate compound with a hydroxyl group-containing (meth)acrylate.

Polyisocyanate Compound

Examples of the polyisocyanate compound include chain saturated hydrocarbon isocyanate, cyclic saturated hydrocarbon isocyanate, and aromatic polyisocyanate. Among these, as the polyisocyanate compound, chain saturated hydrocarbon isocyanate having no light absorption band in a near-ultraviolet region, or cyclic saturated hydrocarbon isocyanate having no light absorption band in a near-ultraviolet region is preferable.

Examples of the chain saturated hydrocarbon isocyanate include tetramethylene diisocyanate, hexamethylene diisocyanate, 2,2,4-trimethylhexamethylene diisocyanate, and 2,4,4-trimethylhexamethylene diisocyanate.

Examples of the cyclic saturated hydrocarbon isocyanate include isophorone diisocyanate, norbornane diisocyanate, dicyclohexylmethane diisocyanate, methylene bis(4-cyclohexyl isocyanate), hydrogenated diphenylmethane diisocyanate, hydrogenated xylene diisocyanate, and hydrogenated toluene diisocyanate.

Example of the aromatic polyisocyanate include 2,4-tolylene diisocyanate, 1,3-xylylene diisocyanate, p-phenylene diisocyanate, 3,3'-dimethyl-4,4'-diisocyanate, 6-isopropyl-1,3-phenyl-diisocyanate, and 1,5-naphthalene diisocyanate.

Polyol Compound

Examples of the polyol compound include diols and polyols.

Examples of diols include alkylene glycols (for example, ethylene glycol, 1,2-propanediol, 1,3-propanediol, 2-methyl-1,3-propanediol, 1,3-butanediol, 1,4-butanediol, 1,5-pentanediol, 2-methyl-1,5-pentanediol, neopentyl glycol, 3-methyl-1,5-pentanediol, 2,3,5-trimethyl-1,5-pentanediol, 1,6-hexanediol, 2-ethyl-1,6-hexanediol, 2,2,4-trimethyl-1,6-hexanediol, 1,8-octanediol, 1,9-nonanediol, 1,10-decanediol, 1,12-dodecanediol, 1,14-tetradecanediol, 1,16-hexadecanediol, 1,2-dimethylol cyclohexane, 1,3-dimethylol cyclohexane, and 1,4-dimethylol cyclohexane).

Examples of polyols include alkylene polyols having three or more hydroxyl groups (for example, glycerin, trimethylolethane, trimethylolpropane, 1,2,6-hexanetriol, 1,2,4-butanetriol, erythritol, sorbitol, pentaerythritol, dipentaezythritol, and mannitol).

Examples of the polyol compound include polyether polyols, polyester polyols, and polycarbonate polyols.

Examples of polyether polyols include multimers of polyols, adducts of polyols and alkylene oxide, and ring-opened polymers of alkylene oxide.

Here, examples of polyols include ethylene glycol, diethylene glycol, propylene glycol, dipropylene glycol, 1,4-butanediol, 1,3-butanediol, neopentyl glycol, 1,6-hexanediol, 1,2-hexanediol, 3-methyl-1,5-pentanediol, 2-butyl-2-ethyl-1,3-propanediol, 2,4-diethyl-1,5-pentanediol, 1,8-octanediol, 1,9-nonane diol, 2-methyl-1,8-octanediol, 1,8-decanediol, octadecane diols, glycerol, trimethylolpropane, pentaerythritol, and hexane triol.

Examples of alkylene oxide include ethylene oxide, propylene oxide, butylene oxide, styrene oxide, epichlorohydrin, and tetrahydrofuran.

Examples of polyester polyols include reaction products of polyols and dibasic acids, and ring-opened polymers of cyclic ester compounds.

Here, examples of polyols are the same as those of polyols exemplified in the description of polyether polyols.

Examples of dibasic acids include carboxylic acids (for example, succinic acid, adipic acid, sebacic acid, dimer acid, maleic acid, phthalic acid, isophthalic acid, and terephthalic acid), and anhydrides of carboxylic acids.

Examples of cyclic ester compounds include ε-caprolactone, and β-methyl-δ-valerolactone.

Examples of polycarbonate polyols include reaction products of glycols and alkylene carbonates, reaction products of glycols and diaryl carbonates, and reaction products of glycols and dialkyl carbonates.

Here, examples of alkylene carbonates include ethylene carbonate, 1,2-propylene carbonate, and 1,2-butylene carbonate. Examples of diaryl carbonates include diphenyl carbonate, 4-methyl diphenyl carbonate, 4-ethyl diphenyl carbonate, 4-propyl diphenyl carbonate, 4,4'-dimethyl diphenyl carbonate, 2-tolyl-4-tolyl carbonate, 4,4'-diethyl diphenyl carbonate, 4,4'-dipropyl diphenyl carbonate, phenyl tolyl carbonate, bischlorophenyl carbonate, phenyl chlorophenyl carbonate, phenyl naphthyl carbonate, and dinaphthyl carbonate.

Examples of dialkyl carbonates include dimethyl carbonate, diethyl carbonate, di-n-propyl carbonate, diisopropyl carbonate, di-n-butyl carbonate, diisobutyl carbonate, di-t-butyl carbonate, di-n-amyl carbonate, and diisoamyl carbonate.

Hydrogen Group-Containing (Meth)Acrylate

Examples of hydrogen group-containing (meth)acrylate include 2-hydroxyethyl (meth)acrylate, 2-hydroxypropyl (meth)acrylate, 2-hydroxybutyl (meth)acrylate, 2-hydroxy-3-phenoxypropyl (meth)acrylate, glycerin di(meth)acrylate, trimethylolpropane di(meth)acrylate, pentaerythritol tri (meth)acrylate, and dipentaerythritol penta(meth)acrylate. Examples of hydrogen group-containing (meth)acrylate include adducts of glycidyl group-containing compounds (for example, alkyl glycidyl ether, allyl glycidyl ether, and glycidyl (meth)acrylate) and (meth)acrylic acids.

Weight Average Molecular Weight of Urethane (Meth) Acrylate

The weight average molecular weight of the urethane (meth)acrylate is preferably 500 to 5,000, and more preferably 1,000 to 3,000.

The weight average molecular weight of the urethane (meth)acrylate is a value measured by gel permeation chromatography (GPC) using polystyrene as a standard substance.

Content of Urethane (Meth)Acrylate

The content of the urethane (meth)acrylate is preferably 10% by weight to 30% by weight, and more preferably 15% by weight to 20% by weight, based on the total amount of the support material.

Here, the urethane (meth)acrylates may be used alone or in a combination of two or more.

Other Photocurable Compounds

Other photocurable compounds are not particularly limited as long as they are photocurable compounds (that is, photocurable compounds having no urethane structure) other than the urethane (meth)acrylate, but examples thereof include photocurable compounds having an ethylenic unsaturated double bond (for example, N-vinyl group, vinyl ether group, or (meth)acryloyl group) as a photocurable group (photopolymerizable group).

Specific examples of other photocurable compounds include (meth)acrylates (monofunctional (meth)acrylates, polyfunctional (meth)acrylate).

Examples of monofunctional (meth)acrylates include linear, branched, or cyclic alkyl (meth)acrylates, (meth)acrylates having a hydroxyl group, (meth)acrylates having a heterocyclic ring, and (meth)acrylamide compounds.

Examples of alkyl (meth)acrylates include methyl (meth)acrylate, ethyl (meth)acrylate, isobutyl (meth)acrylate, t-butyl (meth)acrylate, lauryl (meth)acrylate, stearyl (meth)acrylate, isostearyl (meth)acrylate, cyclohexyl (meth)acrylate, 4-t-cyclohexyl (meth)acrylate, isobornyl (meth)acrylate, and dicyclopentanyl (meth)acrylate.

Examples of (meth)acrylates having a hydroxyl group include hydroxyethyl (meth)acrylate, hydroxypropyl (meth) aczylate, 4-hydroxybutyl (meth)acrylate, polyethylene glycol mono(meth)acrylate, methoxypolyethylene glycol mono(meth acrylate, polypropylene glycol mono(meth)acrylate, methoxy polypropylene glycol mono(meth)acrylate, and mono(meth)acrylate of block polymer of polyethylene glycol-polypropylene glycol.

Examples of (meth)acrylates having a heterocyclic ring include tetrahydrofurfuryl (meth)acrylate, 4-(meth)acryloyloxymethyl-2-methyl-2-ethyl-1,3-dioxolane, 4-(meth)acryloyloxymethyl-2-cyclohexyl-1,3-dioxolane, and adamantyl (meth)acrylate.

Examples of (meth)acrylamide compounds include (meth)acrylamide, N-methyl (meth)acrylamide, N-ethyl (meth)acrylamide, N-propyl (meth)acrylamide, N-butyl (meth)acrylamide, N, N'-dimethyl (meth)acrylamide, N, N'-diethyl (meth)acrylamide, N-hydroxyethyl (meth)acrylamide, N-hydroxypropyl (meth)acrylamide, and N-hydroxybutyl (meth)acrylamide.

Among polyfuctional (meth)acrylates, examples of difunctional (meth)acrylates include 1,10-decanediol diacrylate, 2-methyl-1,8-octanediol diacrylate, 2-butyl-2-ethyl-1,3-propanediol diacrylate, 1,9-nonane diol diacrylate, 1,8-octanediol diacrylate, 1,7-heptanediol diacrylate, polytetramethylene glycol diacrylate, 3-methyl-1,5-pentanediol diacrylate, 1,6-hexanediol diacrylate, neopentyl glycol diacrylate, hydroxypivalic neopentyl glycol diacrylate, tripropylene glycol diacrylate, 1,4-butanediol diacrylate, dipropylene glycol diacrylate, 2-(2-vinyloxyethoxy) ethyl acrylate, ethylene oxide (EO)-modified bisphenol A diacrylate, propylene oxide (PO)-modified bisphenol A diacrylate, ethylene oxide (EO)-modified hydrogenated bisphenol A diacrylate, and ethylene oxide (EO)-modified bisphenol F diacrylate.

Among polyfuctional (meth)acrylates, examples of tri- or higher functional (meth)acrylates include trimethylolpropane triacrylate, ethoxylated trimethylolpropane triacrylate, propoxylated trimethylolpropane triacrylate, pentaerythritol triacrylate, ethoxylated glycerol triacrylate, tetramethylolmethane triacrylate, pentaerythritol tetraacrylate, ethoxylated pentaerythritol tetraacrylate, ethylene oxide (EO)-modified diglycerol tetraacrylate, ditrimethylolpropane tetraacrylate-modified acrylate, dipentaerythritol pentaacrylate, and dipentaerythritol hexaacrylate.

Content of Other Photocurable Compounds

The content of other photocurable compounds is preferably 20% by weight to 60% by weight, and more preferably 30% by weight to 45% by weight, based on the total amount of the support material.

Here, other photocurable compounds may be used alone or in a combination of two or more.

Non-Photocurable Polymer

The non-photocurable polymer is a polymer which does not cause a curing (polymerization) reaction by light (for example, ultraviolet light or electron beam). The non-photocurable polymer is a non-photocurable polymer having a hydroxyl value of 60 mgKOH/g to 300 mgKOH/g.

The hydroxyl value of the non-photocurable polymer is preferably 60 mgKOH/g to 300 mgKOH/g, more preferably 100 mgKOH/g to 290 mgKOH/g, and further preferably 150 mgKOH/g to 280 mgKOH/g, in terms of improving the strippability of the support portion.

The hydroxyl value of the non-photocurable polymer is a value measured in accordance with JIS K-0070-1992.

It is preferable that the non-photocurable polymer is at least one selected from the group consisting of polyether polyols, castor oil polyols, and polyester polyols, in terms of improving the strippability of the support portion.

Polyether Polyol

Examples of polyether polyols include multimers of polyols, adducts of polyols and alkylene oxides, and ring-opened polymers of alkylene oxides.

Examples of polyols include ethylene glycol, diethylene glycol, propylene glycol, dipropylene glycol, 1,4-butanediol, 1,3-butanediol, neopentyl glycol, 1,6-hexanediol, 1,2-hexanediol, 3-methyl-, 5-pentanediol, 2-butyl-2-ethyl-1,3-propanediol, 2,4-diethyl-1,5-pentanediol, 1,8-octanediol, 1,9-nonanediol, 2-methyl-1,8-octanediol, 1,8-decanediol, octadecane diol, glycerol, trimethylolpropane, pentaerythritol, and hexane triol.

Examples of alkylene oxides include ethylene oxide, propylene oxide, butylene oxide, styrene oxide, epichlorohydrin, and tetrahydrofuran.

Castor Oil Polyol

As the castor oil polyol, a modified castor oil obtained by modifying castor oil with polyol, or a modified castor oil aliphatic acid obtained by modifying a castor oil aliphatic acid (aliphatic acid obtained from castor oil) with a polyol is exemplified.

Here, examples of polyols are the same as those of polyols exemplified in the description of polyether polyols.

Polyester Polyol

Examples of polyester polyols include reaction products of polyols and dibasic acids, and ring-opened polymers of cyclic ester compounds.

Examples of polyols are the same as those of polyols exemplified in the description of polyether polyols.

Examples of dibasic acids include carboxylic acids (for example, succinic acid, adipic acid, sebacic acid, dimer acid, maleic acid, phthalic acid, isophthalic acid, and terephthalic acid), and anhydrides of carboxylic acids.

Examples of cyclic ester compounds include ε-caprolactone, and β-methyl-δ-valerolactone.

Here, the non-photocurable polymer may be used in combination with polyols together with the above-described specific polyols. In particular, the polyols may be used in combination with polyester polyols. That is, as the non-photocurable polymer, mixtures of polyester polyols and polyols are exemplified.

The content of polyols used in combination with the above-described specific polyols may be 30% by weight to 60% by weight (preferably, 35% by weight to 50% by weight), based on the total amount of the photocurable polymer. Particularly, when a mixture of polyester polyol and the polyol is used, the weight ratio thereof (polyester polyol/polyol) may be 30/70 to 10/90 (preferably, 25/75 to 20/80).

Here, examples of the polyols are the same as those of polyols exemplified in the description of polyether polyols.

Weight Average Molecular Weight of Non-Photocurable Polymer

The weight average molecular weight of the non-photocurable polymer is preferably 200 to 1,000, and more preferably 250 to 850, in terms of improving the strippability of the support portion.

The weight average molecular weight of the non-photocurable polymer is a value measured by gel permeation chromatography (GPC) using polystyrene as a standard substance.

Content of Non-Photocurable Polymer

The content of the non-photocurable polymer may be 25% by weight to 60% by weight, based on the total amount of the support material. Particularly, the content of the non-photocurable polymer is preferably 30% by weight to 50% by weight, more preferably 35% by weight to 50% by weight, and further preferably 40% by weight to 45% by weight, based on the total amount of the support material, in terms of improving the strippability of the support portion.

Here, the non-photocurable polymer may be used alone or in a combination of two or more.

Photopolymerization Initiator

As the photopolymerization initiator, well-known polymerization initiators, such as photoradical polymerization initiators and photocationic initiators, are exemplified. As the photopolymerization initiator, a photoradical polymerization initiator is preferable.

Examples of the photoradical polymerization initiator include aromatic ketones, acylphosphine oxide compounds, aromatic onium salt compounds, organic peroxides, thio compounds (thioxanthone compounds, thiophenyl group-containing compounds, and the like), hexaarylbiimidazole compounds, ketoxime ester compounds, borate compounds, azinium compounds, metallocene compounds, active ester compounds, compounds having a carbon-halogen bond, and alkyl amine compounds.

Specific examples of the photoradical polymerization initiator include well-known photopolymerization initiators, such as acetophenone, acetophenone benzyl ketal, 1-hydroxycyclohexyl phenyl ketone, 2,2-dimethoxy-2-phenyl acetophenone, xanthone, fluorenone, benzaldehyde, fluorene, anthraquinone, triphenylamine, carbazole, 3-methyl acetophenone, 4-chloro-benzophenone, 4,4'-dimethoxy benzophenone, 4,4'-diamino benzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenyl-propan-1-one, thioxanthone, diethyl thioxanthone, 2-isopropyl thioxanthone, 2-chloro thioxanthone, 2-methyl-1-[4-(methylthio)phenyl]-2-morpholino-propan-1-one, bis(2,4,6-trimethylbenzoyl)-phenyl phosphine oxide, 2,4,6-trimethylbenzoyl-diphenyl-phosphine oxide, 2,4-diethyl thioxanthone, and bis-(2,6-dimethoxybenzoyl) 2,4,4-trimethylpentyl phosphine oxide.

Content of Photopolymerization Initiator

The content of the photopolymerization initiator is preferably 1% by weight to 10% by weight, and more preferably 3% by weight to 5% by weight, based on the total amount of the photocurable compound.

Here, the photopolymerization initiator may be used alone or in a combination of two or more.

Polymerization Inhibitor

Examples of the polymerization inhibitor include well-known polymerization inhibitors, such as phenolic polymerization inhibitors (for example, p-methoxy phenol, cresol, t-butyl catechol, 3,5-di-t-butyl-4-hydroxytoluene, 2,2'-methylenebis(4-methyl-6-t-butylphenol), 2,2'-methylenebis(4-ethyl-6-butylphenol), 4,4'-thiobis(3-methyl-6-t-butylphenol), and the like), hindered amine, hydroquinone monomethyl ether (MEHQ), and hydroquinone.

Content of Polymerization Inhibitor

The content of the polymerization inhibitor is preferably 0.1% by weight to 1% by weight, and more preferably 0.3% by weight to 0.5% by weight, based on the total amount of the photocurable compound.

Here, the polymerization inhibitor may be used alone or in a combination of two or more.

Surfactant

Examples of the surfactant include well-known surfactants, such as silicone surfactants, acrylic surfactants, cationic surfactants, anionic surfactants, nonionic surfactants, amphoteric surfactants, and fluorine surfactants.

Content of Surfactant

The content of the surfactant is preferably 0.05% by weight to 0.5% by weight, and more preferably 0.1% by weight to 0.3% by weight, based on the total amount of the photocurable compound.

Here, the surfactant may be used alone or in a combination of two or more.

Other Additives

In addition to the above additives, examples of other additives include well-known additives, such as a colorant, a solvent, a sensitizer, a fixing agent, a fungicide, a preservative, an antioxidant, an ultraviolet absorber, a chelating agent, a thickener, a dispersing agent, a polymerization accelerator, a penetration enhancer, and a wetting agent (moisturizer).

Characteristics of Support Material

The surface tension of the support material according to the present embodiment is, for example, in a range of 20 mN/m to 40 mN/m.

Here, the surface tension thereof is a value measured using a Wilhelmy type surface tension meter (manufactured by Kyowa interface Science Co., Ltd.) under an environment of a temperature of 23° C. and a relative humidity (RH) of 55%.

The viscosity of the ink according to the present embodiment is, for example, in a range of 30 mPa·s to 50 mPa·s.

Here, the viscosity thereof is a value measured using the Rheomat 115 (manufactured by Contraves) as a measurement device under a condition of a temperature of 23° C. and a shear rate of 1400 $s^{-1}$.

Three-Dimension Forming Composition Set

The three-dimension forming composition set (hereinafter, referred to as "composition set") according to the present embodiment includes a model material (three-dimension forming material) and the aforementioned support material (three-dimension forming support material) according to the present embodiment.

The model material contains a photocurable compound containing an urethane (meth)acrylate. The model material may contain other additives, such as a photopolymerization initiator, a polymerization inhibitor, and a surfactant, in addition to the photocurable compound. Here, as the photocurable compound and the additives (such as a photopolymerization initiator, a polymerization inhibitor, and a surfactant), those similar to the various materials described in the support material according to the present embodiment are applied.

Three-Dimension Forming Apparatus/Three-Dimensional Shaped Product Preparing Method The three-dimension forming apparatus according to the present embodiment include: a first discharge unit discharging a model material (three-dimension forming material) containing a photocurable compound containing the urethane (meth)acrylate; a second discharge unit discharging the support material (three-dimension forming support material) according to the present embodiment; and a light irradiation unit applying light which cures the discharged model material and support material.

In the three-dimension forming apparatus according to the present embodiment, a method of preparing a three-dimensional shaped product (method of preparing a three-dimensional shaped product according to the present embodiment), including the steps of: discharging a model material containing a photocurable compound containing the urethane (meth)acrylate and curing the model material by light irradiation to form a shaped product; and discharging the droplets of the three-dimension forming support material according to the present embodiment and curing the droplets by light irradiation to form a support portion for supporting at least apart of the shaped product, is carried out. Further, in the method of preparing a three-dimensional shaped product according to the present embodiment, after the formation of the shaped product, the support portion is removed, so as to prepare a three-dimensional shaped product.

Hereinafter, the three-dimension forming apparatus according to the present embodiment will be described with reference to the attached drawings.

FIG. 1 is a configuration view schematically showing an example of the three-dimension forming apparatus according to the present embodiment.

The three-dimension forming apparatus 101 according to the present embodiment is an inkjet type three-dimension forming apparatus. As shown in FIG. 1, the three-dimension forming apparatus 101 includes a forming unit 10 and a forming board 20. Further, the three-dimension forming apparatus 101 includes a model material cartridge 30 filled with a model material and detachably mounted in the apparatus and a support material cartridge 32 filled with a support material. In FIG. 1, MD indicates a shaped product, and SP indicates a support portion.

The forming unit 10 includes a model material discharge head 12 (an example of the first discharge unit) for discharging the droplets of the model material, a support material discharge head 14 (an example of the second discharge unit) for discharging the droplets of the support material, and a light irradiation device 16 for applying light. In addition, the forming unit 10, although not shown, may further include a rotation roller for removing excess amount of the model material and support material discharged on the forming board 20 to flatten the model material and support material.

The forming unit 10 is configured to be moved over the forming region of the forming board 20 by a driving unit (not shown) in a main scanning direction and in a sub-scanning direction intersecting with (for example, perpendicular to) the main scanning direction. That is, the forming unit 10 is configured to be moved by a so-called, carriage method.

Each of the model material discharge head 12 and the support material discharge head 14 discharges the droplets of each of the materials using a piezo method (piezoelectric method) in which the droplets are discharged by pressure. Each of the discharge heads is not limited thereto, and may be a discharge head for discharging each material using pressure from a pump.

The model material discharge head 12 is connected with the model material cartridge 30 through a supply line (not shown). Further, the model material is supplied to the model material discharge head 12 by the model material cartridge 30.

The support material discharge head 14 is connected with the support material cartridge 32 through a supply line (not shown). Further, the model material is supplied to the support material discharge head 14 by the support material cartridge 32.

Each of the model material discharge head 12 and the support material discharge head 14 is a short-length discharge head configured such that its effective discharge region (arrangement region of the nozzles discharging the model material and the support material) is smaller than the forming region of the forming board 20.

Further, each of the model material discharge head 12 and the support material discharge head 14 may be an elongated head which is configured such that its effective discharge region (arrangement region of the nozzles discharging the model material and the support material) is equal to or larger than the forming region width (length in a direction intersecting with (perpendicular to) the moving direction (main scanning direction) of the forming unit 10) of the forming board 20. In this case, the forming unit 10 is configured to move only in the main scanning direction.

The light irradiation device 16 is selected depending on the kind of the model material and the support material. As the light irradiation device 16, an ultraviolet irradiation device or an electron beam irradiation device is exemplified.

Here, examples of the ultraviolet irradiation device include devices having a light source, such as a metal halide lamp, a high-pressure mercury lamp, super high-pressure mercury lamp, a deep ultraviolet lamp, a lamp to excite the mercury lamp without electrodes from the outside by means of microwaves, an ultraviolet laser, a xenon lamp, and UV-LED.

Examples of the electron beam irradiation device include a scanning-type electron beam irradiation device, a curtain-type electron beam irradiation device, and a plasma discharge-type electron beam irradiation device.

The forming board 20 has a surface having a forming region in which the model material and the support material are discharged to form a shaped product. Further, the forming board 20 is configured to be lifted by a driving unit (not shown).

Next, the operation of the three-dimension forming apparatus 101 (method of preparing a three-dimensional shaped product) will be described.

First, through a computer (not shown), two-dimensional shape data (slice data) for forming a shaped product, as data for three-dimension formation, is created from three-dimensional Computer Aided Design (CAD) data of a three-dimensional shaped product formed by a model material. In this case, two-dimensional shape data (slice data) for forming a support portion using a support material is also created. The two-dimensional shape data for forming the support portion is configured such that, when the width of an upper portion of a shaped product is larger than the width of a lower portion of the shaped product, in other words, when there is an overhanging portion, a support portion is formed to support the overhanging portion from below.

Next, based on the two-dimensional data for forming a shaped product, the model material is discharged from a model material discharge head 12 while moving the forming unit 10, so as to form a model material layer on the forming board 20. Then, the model material layer is irradiated with light by the light irradiation device 16 to cure the model material, thereby forming a layer to be a part of the shaped product.

If necessary, based on the two-dimensional data for forming a support portion, a support material is discharged from the support material discharge head 14 while moving the forming unit 10, so as to form a support material layer adjacent to the model material layer on the forming board 20. Then, the support material layer is irradiated with light by the light irradiation device 16 to cure the support material, thereby forming a layer to be a part of the support portion.

Figure 2A:
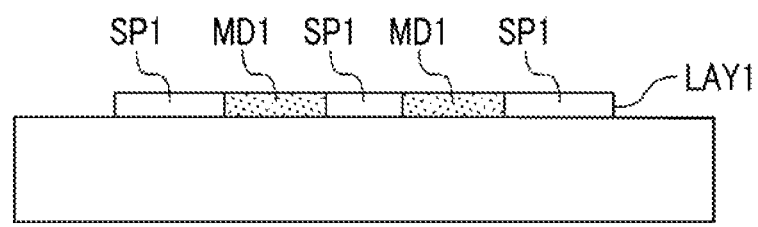
FIG. 2A is a process view showing an example of a method of preparing a three-dimensional shaped product according to the present embodiment.

In this way, a first layer (LAY1) including the layer to be a part of the shaped product and, if necessary, the layer to be a part of the support portion is formed (refer to FIG. 2A). Here, in FIG. 2A, MD1 indicates the layer to be a part of the shaped product in the first layer (LAY1), and SP1 indicates the layer to be a part of the support portion in the first layer (LAY1).

Next, the forming board 20 descends. Due to the descending of the forming board 20, the thickness of the second layer (second layer including the layer to be a part of the shaped product and, if necessary, the layer to be a part of the support portion), which will be formed later, is set.

Figure 2B:
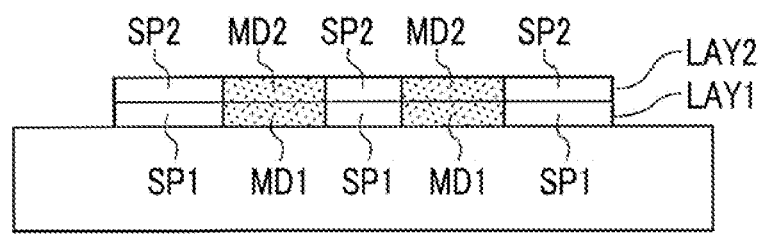
FIG. 2B is a process view showing an example of a method of preparing a three-dimensional shaped product according to the present embodiment.

Next, similarly to the first layer (LAY1), a second layer (LAY2) including the layer to be a part of the shaped product and, if necessary, the layer to be apart of the support portion is formed (refer to FIG. 2B). Here, in FIG. 2B, MD2 indicates the layer to be a part of the shaped product in the second layer (LAY2), and SP2 indicates the layer to be a part of the support portion in the second layer (LAY2).

Figure 2C:
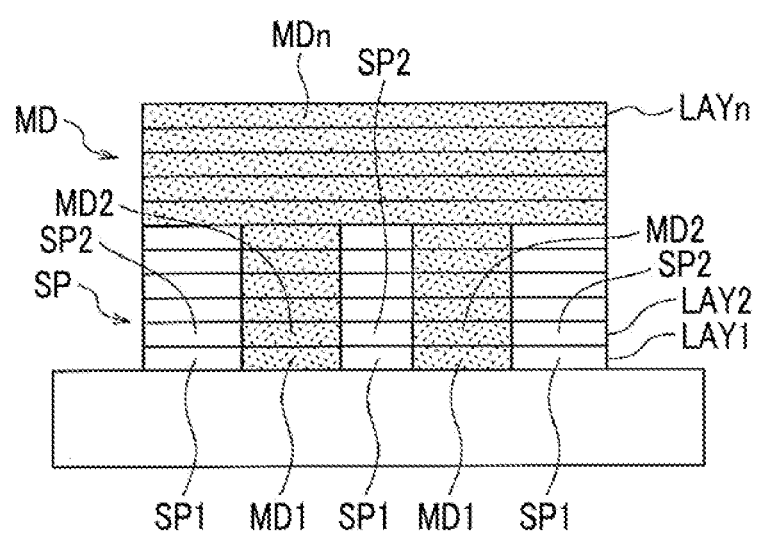
FIG. 2C is a process view showing an example of a method of preparing a three-dimensional shaped product according to the present embodiment.

Further, the operations of forming the first layer (LAY1) and the second layer (LAY2) are repeatedly conducted to form layers up to the n-th layer (LAYn). In this case, a shaped product having at least a part that is supported with the support portion is formed (refer to FIG. 2C). Here, in FIG. 2C, MDn indicates the layer to be a part of the shaped product in the n-th layer (LAYn). MD indicates the shaped product. SP indicates the support portion.

Thereafter, when the support portion is removed from the shaped product, a desired shaped product is obtained. Here, as the method of removing the support portion, a method of removing the support portion by hand (break away method), a method of removing the support portion by injecting gas or liquid, or the like is employed.

Meanwhile, the obtained shaped product may be subjected to post-treatment such as polishing.

EXAMPLES

Hereinafter, the present invention will be described in more detail based on the following Examples. However, the present invention is not limited thereto. Here, "part" means "part by weight" unless otherwise defined.

Preparation of Model Material 1

Urethane acrylate oligomer: 12.70 parts by weight ("U-200PA", manufactured by Shin-Nakamura Chemical Co., Ltd.)

Urethane acrylate oligomer: 16.40 parts by weight ("UA-4200", manufactured by Shin-Nakamura Chemical Co., Ltd.)

Acrylate monomer: 50.40 parts by weight ("VEEA", manufactured by Nippon Shokubai Co., Ltd., 2-(2-vinyloxyethoxy)ethyl acrylate)

Acrylate monomer: 14.60 parts by weight ("IBXA", manufactured by Osaka Organic Chemical Industry Co., Ltd., isobornyl acrylate)

Polymerization inhibitor: 0.50 parts by weight (MEHQ (hydroquinone monomethyl ether))

Polymerization initiator: 3.00 parts by weight ("LUCIRIN TPO", manufactured by BASF Corporation, 2,4,6-trimethylbenzoyl-diphenyl-phosphine oxide)

Polymerization initiator: 1.00 parts by weight ("Irgacure 379", manufactured by BASF Corporation, 2-dimethylamino-2-(4-methylbenzyl)-1-(4-morpholin-4-yl-phenyl)-butan-1-one)

Sensitizer: 1.00 parts by weight (ITX (2-isopropylthioxanthone))

Cyan pigment: 1.00 parts by weight ("KY410-4B" manufactured by Taisei Kako Co., Ltd.)

Surfactant: 0.20 parts by weight ("TEGO Wet 270", polyether modified siloxane copolymer)

The above components are mixed to prepare a model material 1.

Example 1

Preparation of Support Material 1

Polyether polyol ("Adeka polyether P Series P-400", manufactured by ADEKA Corporation), as a non-photocurable polymer, is mixed such that the content ratio of the prepared model material 1 with respect to the entire support material is 25% by weight, so as to prepare a support material 1.

Examples 2 to 8

Preparation of Support Materials 2 to 8

Support materials 2 to 8 are prepared in the same manner as in the preparation of the support material 1, except that the kind and amount of non-photocurable polymer (or monomer) are changed as shown in Table 1.

Comparative Examples 1 and 2

Preparation of Comparative Support Materials C1 and C2

Comparative support materials C1 and C2 are prepared in the same manner as in the preparation of the support material 1, except that the kind and amount of non-photocurable polymer (or monomer) are changed as shown in Table 1.

Measurement

With respect to the support material prepared in each Example, the hydroxyl value of the non-photocurable polymer is measured in accordance with JIS K-0070-1992.

Further, the weight average molecular weight of the non-photocurable polymer is measured by gel permeation chromatography (GPC) using polystyrene as a standard substance. Measurement conditions are as follows.

Measuring device: HLC-8302 GPC EcoSEC (manufactured by Tosoh Corporation)

Eluent: tetrahydrofuran

Column: sample column TSKgel SuperMultipore HZ-M×2, reference column TSKgel SuperMultipore HZ-M×2

Column temperature: 40° C.

Flow rate: 0.35 ml/min

Detector: differential refractometer

Evaluation

The support material prepared in each Example is evaluated as follows. The results thereof are summarized in Table 1 below.

Compatibility

The compatibility of the non-photocurable polymer of the support material is observed visually and evaluated. Evaluation criteria are as follows.

Evaluation Criteria

A: non-photocurable polymer is uniformly mixed at room temperature (25° C.) and becomes transparent. Transparency is maintained even when it is stored in a refrigerator at 5° C. or lower.

B: non-photocurable polymer is uniformly mixed at room temperature (25° C.) and becomes transparent. However, turbidity occurs when it is stored in a refrigerator at 5° C. or lower.

C: turbidness occurs at room temperature (25° C.).

Strippability

After the coating film of model material 1 is formed on a substrate, the coating film of model material 1 is irradiated with ultraviolet light to form the cured layer of model material 1. Next, the coating film of support material is directly formed on the cured layer of model material 1, and then the coating film of support material is irradiated with ultraviolet light to form the cured layer of support material. The curing of model material and support material with ultraviolet light is performed using UV-LED at an irradiation wavelength of 365 nm and a curing energy of 150 mJ.

Then, support material is stripped from the laminate of the substrate, the cured layer of model material 1 and the cured layer of support material by a finger or pincette, and the strippability of support material is evaluated. Evaluation criteria are as follows.

Evaluation Criteria

A: support material may be easily stripped by rubbing with a finger.

B: support material may be stripped with a finger after rubbing with a pincette to make a portion to be easily stripped.

C: support material may be stripped by rubbing with a pincette, but cannot be stripped by rubbing with a finger.

Interface Damaging

After the evaluation of strippability, the surface of the cured layer of model material 1 is observed, and the interface damaging between the cured layer of model material 1 and the cured layer of support material is evaluated. Evaluation criteria are as follows.

Evaluation Criteria

A: color and scratches do not exist on the surface of model material.

B: color exists on the surface of model material, but scratches do not exist thereon.

C: color and scratches exist on the surface of model material.

Ink Jet (IJ) Suitability

The ink jet (IJ) suitability of the support material is evaluated as follows.

The viscosity at 55° C. is measured by the viscometer TVE-20L manufactured by TOKIMEC Corporation, and whether or not the measured viscosity is present within the predetermined viscosity range is evaluated. Evaluation criteria are as follows.

Evaluation Criteria

A: more than 10 mPa·s and less than 1.4 mPa·s

B: 10 mPa·s or less

C: 14 mPa·s or more

TABLE 1

| | Non-photocurable polymer (or monomer) | | | | Evaluation | | | |
|---|---|---|---|---|---|---|---|---|
| | Kind | Hydroxyl value (mgOH/g) | Weight average molecular weight | Content (to support material) | Compatibility | Strippability | Interface damaging | IJ suitability |
| Example 1 | P-400 | 254-281 | 400 | 25% | A | B | B | A |
| Example 2 | P-400 | 254-281 | 400 | 30% | A | A | A | A |
| Example 3 | P-400 | 254-281 | 400 | 40% | A | A | A | A |
| Example 4 | P-400 | 254-281 | 400 | 50% | A | A | A | A |
| Example 5 | H31 (55%) H62 (45%) | 157-170 245-275 | 330 350 | 25% | A | B | B | A |
| Example 5 | H31 (55%) H62 (45%) | 157-170 245-275 | 330 350 | 30% | A | A | A | A |
| Example 7 | H31 (55%) H62 (45%) | 157-170 245-275 | 330 350 | 40% | B | A | A | A |
| Example 8 | OD-X-2586 (18%) PG (82%) | 200 55 | 850 76 | 30% | A | A | A | A |
| Comparative Example 1 | PG | 55 | 76 | 30% | A | B | C | A |
| Comparative Example 2 | glycerin | 1170 | 92 | 20% | C | — | — | — |

From the above results, it is found that the support material of the present invention is good in the evaluation of strippability compared to the support material of each Comparative Example.

Further, it is found that the support material of the present invention is good in the evaluation of compatibility, interfacial damaging, and ink jet suitability.

Below, details of abbreviations in Table 1 are shown. In Table 1, in the column of "kind" of the non-photocurable polymer, each of the numerical values in parentheses indicates the rate (% by weight) of two kinds of non-photocurable polymers (or monomers).

P-400: polyether polyol ("Adeka polyether P-400", manufactured by ADEKA Corporation)

H31: castor oil polyol ("URIC H-31", manufactured by Itoh Oil Co., Ltd.)

H62: castor oil polyol ("URIC H-62", manufactured by Itoh Oil Co., Ltd.)

OD-X-2586: polyester polyol ("POLYLITE OD-X-2586", manufactured by DIC Corporation)

PG: propylene glycol

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A three-dimension forming composition set comprising:
    a three-dimension forming material comprising a photocurable compound that contains an urethane (meth) acrylate; and
    a three-dimension forming support material comprising (i) a photocurable compound that contains an urethane (meth)acrylate and (ii) a non-photocurable polymer having a hydroxyl value of 60 mgKOH/g to 300 mgKOH/g, wherein:
    the non-photocurable polymer is a polymer that is not curable by ultraviolet light;
    the non-photocurable polymer includes at least one of polyether polyol, polyester polyol, or castor oil polyol that is obtained by modifying a castor oil or castor oil aliphatic acid with a polyol;
    a weight average molecular weight of the non-photocurable polymer is from 200 to 850; and
    a weight average molecular weight of the urethane (meth) acrylate of the three-dimension forming support material is from 500 to 5,000.

2. The three-dimension forming composition set according to claim 1, wherein the non-photocurable polymer includes the polyether polyol.

3. The three-dimension forming composition set according to claim 1, wherein a content of the non-photocurable polymer is 30% by weight to 50% by weight, based on the total amount of the three-dimension forming support material.

4. The three-dimension forming composition set according to claim 1, wherein a content of the non-photocurable polymer is 35% by weight to 50% by weight, based on the total amount of the three-dimension forming support material.

5. The three-dimension forming composition set according to claim 1, wherein the non-photocurable polymer has a hydroxyl value of 100 mgKOH/g to 290 mgKOH/g.

6. The three-dimension forming composition set according to claim 1, wherein the weight average molecular weight of the urethane (meth)acrylate of the three-dimension forming support material is from 1,000 to 3,000.

7. The three-dimension forming composition set according to claim 1, wherein a content of the urethane (meth) acrylate of the three-dimension forming support material is 10% by weight to 30% by weight, based on the total amount of the three-dimension forming support material.

8. The three-dimension forming composition set according to claim 1, wherein a content of the non-photocurable polymer is 25% by weight to 60% by weight, based on the total amount of the three-dimension forming support material.

9. The three-dimension forming composition set according to claim 1, wherein the non-photocurable polymer includes the polyester polyol.

10. The three-dimension forming composition set according to claim 1, wherein the non-photocurable polymer includes the castor oil polyol.

11. The three-dimension forming composition set according to claim 1, wherein the three-dimension forming support material further comprises a polymerization inhibitor.

12. A three-dimension forming composition set comprising:
    a three-dimension forming material comprising a photocurable compound that contains an urethane (meth) acrylate; and
    a three-dimension forming support material comprising (i) a photocurable compound that contains an urethane (meth)acrylate and (ii) a non-photocurable polymer having a hydroxyl value of 60 mgKOH/g to 300 mgKOH/g, wherein:
    the non-photocurable polymer includes at least one of polyether polyol, polyester polyol, or castor oil polyol that is obtained by modifying a castor oil or castor oil aliphatic acid with a polyol;
    a weight average molecular weight of the non-photocurable polymer is from 200 to 850;
    a content of the non-photocurable polymer is 25% by weight to 60% by weight, based on the total amount of the three-dimension forming support material; and
    a content of the urethane (meth)acrylate of the three-dimension forming support material is 10% by weight to 30% by weight, based on the total amount of the three-dimension forming support material.

13. The three-dimension forming composition set according to claim 12, wherein a weight average molecular weight of the urethane (meth)acrylate of the three-dimension forming support material is from 500 to 5,000.

14. The three-dimension forming composition set according to claim 12, wherein the three-dimension forming support material is different in composition from the three-dimension forming material at least due to inclusion of the non-photocurable polymer.

15. The three-dimension forming composition set according to claim 1, wherein the three-dimension forming support material is different in composition from the three-dimension forming material at least due to inclusion of the non-photocurable polymer.

16. A three-dimension forming composition set comprising:
    a three-dimension forming material comprising a photocurable compound that contains an urethane (meth) acrylate; and
    a three-dimension forming support material comprising (i) a photocurable compound that contains an urethane (meth)acrylate and (ii) a non-photocurable polymer having a hydroxyl value of 60 mgKOH/g to 300 mgKOH/g, wherein:

the non-photocurable polymer includes at least one castor oil polyol that is obtained by modifying a castor oil or castor oil aliphatic acid with a polyol; and a weight average molecular weight of the urethane (meth) acrylate of the three-dimension forming support material is from 500 to 5,000.

17. The three-dimension forming composition set according to claim 16, wherein:

a content of the non-photocurable polymer is 25% by weight to 60% by weight, based on the total amount of the three-dimension forming support material; and a content of the urethane (meth)acrylate of the three-dimension forming support material is 10% by weight to 30% by weight, based on the total amount of the three-dimension forming support material.

* * * * *